United States Patent
Keser et al.

(10) Patent No.: US 7,438,227 B2
(45) Date of Patent: Oct. 21, 2008

(54) SYSTEM AND METHOD TO DETERMINE THE PRICES AND ORDER QUANTITIES THAT MAXIMIZE A RETAILER'S TOTAL PROFIT

(75) Inventors: Claudia Keser, Shrub Oak, NY (US); Tomasz Nowicki, Briarcliff Manor, NY (US); Grzegorz Swirszcz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 11/424,958

(22) Filed: Jun. 19, 2006

(65) Prior Publication Data

US 2007/0294123 A1 Dec. 20, 2007

(51) Int. Cl.
*G06K 15/00* (2006.01)
(52) U.S. Cl. .................. 235/383; 235/375; 235/378; 705/400
(58) Field of Classification Search ............ 235/383, 235/375, 487, 378, 385; 705/52, 14, 400
See application file for complete search history.

(56) References Cited

U.S. PATENT DOCUMENTS

2002/0099622 A1* 7/2002 Langhammer ............... 705/26
2003/0023563 A1* 1/2003 Kutaragi et al. ............... 705/52
2003/0088466 A1* 5/2003 Fitzpatrick ..................... 705/14

OTHER PUBLICATIONS

Inman et al.; "Where the Rubber Meets the Road: A Model of In-store Consumer Decision Making"; Marketing Science Institute, Report No. 98-122; Oct. 1998;1 pp. 1-34.
Bucklin et al.; "Determining Inter-Brand Substitutability Through Survey Measurement of Consumer Preference Structures"; Marketing Science Institute, Report No. 91-102; Jan. 1991; pp. 1-.39.
Consideration, Choice and Classifying Loyalty; A. Terech, et al. Nov. 2003.
A Brand Switching Model With Implications for Marketing Strategies; R. Columbo, et al.; Marketing Science, vol. 8, No. 1 (Winter, 1989), pp. 89-99.
The Price Consideration Model of Brand Choice; A. Chang, et al.; May 2005, Revised Mar. 2006.

* cited by examiner

*Primary Examiner*—Edwyn Labaze
(74) *Attorney, Agent, or Firm*—Witham, Curtis, Christofferson & Cook, PC; Stephen C. Kaufman

(57) ABSTRACT

The present invention provides a system and method for determining the prices and order quantities that maximize a retailer's expected profit by using a multi-dimensional distribution of the highest prices that customers are willing to pay. This is novel, as well in the literature as in the patent database. Brand switching is dealt with, taking into account that consumers who come into the store with a-priori preferences for products build a-posteriori preferences at the point of purchase based on actual retail prices and availabilities in the store.

4 Claims, 4 Drawing Sheets

SYSTEM AND METHOD TO DETERMINE THE PRICES AND ORDER QUANTITIES THAT MAXIMIZE A RETAILER'S TOTAL PROFIT

BACKGROUND OF THE INVENTION

1. Field of the Invention

The present application generally relates to the pricing and ordering of brand-differentiated products in retailing (in the consumer durables and services categories).

2. Background Description

While the problem is of great importance in practice, we are not aware of publications in the professional literature on systems and methods for establishing optimal prices and order quantities for brand-differentiated products in retailing. A number of investigators have considered consumers' brand substitutability. See, for example, R. E. Bucklin and V. Srinivasan, 1991; A. Ching, T. Erdem, and M. Keane, 2006; R. A. Colombo and D. G. Morrison, 1989; J. J. Inman and R. S. Winer, 1998; and A. Terech, R. E. Bucklin, and D. G. Morrison, 2003.

SUMMARY OF THE INVENTION

An embodiment of this invention relates to a method for determining prices and order quantities that maximize a retailer's total profit. This method is based on consumer demand functions taking cross-price elasticities into account. This kind of demand function is derived from a model that takes brand switching into account. We develop a new, simple approach to model customers' in-store brand choice as a function of a distribution of maximum prices that they are willing to pay, which can be estimated based on a survey method. This novel approach to model customers' brand choice is key for the application of the method, since the empirical estimation of consumer demand functions has been difficult due to a lack of historical transaction or panel-type data for consumer durables and services.

Brand-choice models in the professional literature mostly consider repetitive shopping behavior, in particular purchases of perishable goods in supermarkets, for which extensive databases exist (Bucklin and Srivinasan, 1991; Inman and Winter, 1998; Ching et al., 2005). While some of the brand models that could potentially be applied for consumer durables classify consumers into hard-core loyals and potential switchers (Colombo and Morrison, 1989) or into groups with varying degrees of loyalty between these two extremes (Terech et al., 2003), our model assumes that (1) everybody potentially switches brands and (2) that consumers decide depending on price and availability.

The present invention thus provides a system and method for determining the prices and order quantities that maximize a retailer's total profit by using a multi-dimensional distribution of the highest prices that customers are willing to pay.

The present invention provides a model on optimal retail pricing and order planning for horizontally differentiated products (brands) in a given product category. To deduce customer demand functions under multi-brand competition, it also models customer in-store brand-switching behavior. Based on the deduced demand functions, the system and method solve the retailer's profit maximization problem for the considered product category.

While one simplified version of the model presented herein considers two horizontally differentiated products (brands), it can easily be extended to several products. The products may be consumer durables or services. They could, for example, be consumer electronics or home appliances—items that are bought occasionally and for which brand typically matters. They could also be, for example, service contracts for consumer electronics products and home appliances.

Usually, there is a lack of historical transaction or panel-type data on the purchase of consumer durables, which makes the estimation of consumer demand functions difficult. This is why we present a simple model of in-store brand choice, which can be empirically estimated based on a survey method. The principal assumption of this model is that customers come into the store with a priori preferences for the products but then build a posteriori preferences at the point of purchase based on the actual prices and availabilities in the store.

The model assumes a joint multi-dimensional distribution of customer preferences rather than several one-dimensional distributions for each of the brands. The model is kept very simple—e.g., it considers no consumer factors such as age and income—for three major reasons:

First, the model is specifically designed for consumer durables, which are purchased much less frequently than consumable products such as groceries, with the result that huge data sets are typically not available for consumer durables.

Second, the model takes into account the impact of limited product availability on the customers' actual brand choice.

Third and foremost, the model deduces consumer demand functions that are plugged into the retailer's profit maximization function. The analysis is restricted to simple demand functions in order to keep the retailer's profit maximization function tractable.

The Basic Model

The basic model considers a retailer who is selling two products, X and Y. The retailer buys products X and Y at given unit wholesale prices $w_x$ and $w_y$, respectively. The wholesalers' list prices for products X and Y are $C_x$ and $C_y$, respectively. The retailer's decision variables are the unit retail prices, $P_x$ and $P_y$, and the quantities x and y that he orders from the wholesalers of products X and Y, respectively.

The basic model assumes that the retailer maximizes his expected profit, denoted as $\Pi(.)$, from selling the two products. The expected profit is a function of the quantities x and y, the retail prices $P_x$ and $P_y$, expected customer demand of product X, $D_x$, and expected customer demand of product Y, $D_y$:

$$\Pi(x,y,P_x,P_y) = D_x P_x - x w_x + D_y P_y - y w_y, \quad (1)$$

The treatment of expected demand is discussed below. The basic model assumes that customers come to the store to buy either one unit of product X or one unit of product Y or nothing. One may employ a brand switching model under the assumption that customers come to the retailer's store with a priori preferences, represented by maximal prices they are willing to pay for either product (reservation prices). The upper boundary to these reservation prices is given by the respective list prices. Depending on the retail prices, $P_x$ and $P_y$, for X and Y, respectively, customers then build their a posteriori preferences so that they choose the product that yields the maximal subjective gain, which is expressed by the difference of reservation price and actual retail price. The model deduces expected customer demand functions, $D_x$ and $D_y$, which depend on the distribution of the customers' joint a priori preferences for the two products, the retail prices and the retailer's capacities for products X and Y.

Consumer Demand Model

Customers' behavior may be modeled as follows: The probabilistic space $\{\Omega,\text{Prob}\}$ describes the set of customers. The number of customers visiting a store is N. Each customer $\omega \in \Omega$ carries personal preferences, $g_x(\omega)$ and $g_y(\omega)$, toward product X and Y, respectively. A customer's preference for a product describes the maximal price that this customer is willing to pay for the product. Preferences are modeled by random variables with values between zero and the respective list price. The upper boundary is due to the assumption that no individual is willing to buy a product at a price above its list price. Note that the joint multi-dimensional distribution of personal preferences builds the foundation of the consumer demand model.

Case of Unlimited Supply

To begin with, the consumer demand model assumes that there is unlimited supply of products X and Y, so that every customer who decides to buy a product can get this product. Each customer $\omega$ decides to buy either product X or Y or neither of them in the following way. First he evaluates his subjective gain $W_x(\omega)=g_x(\omega)-p_x$ for product X, and $W_y(\omega)=g_y(\omega)-p_y$ for product Y. If both subjective gains, $W_x$ and $W_y$, are negative, the customer buys nothing. Otherwise, he buys the product with the larger gain. If both gains are equal, we assume that he buys product X. This is an arbitrary tie-breaking rule. It is unimportant, though, given the assumption of zero probability for such an event to occur.

The expected demand function, $D_x$, for product X is given by the probability that $W_x$ is positive and larger (or equal) than $W_y$, multiplied by the number of customers N. Similarly, the expected demand function, $D_y$, for product Y is given by the probability that $W_y$ is positive and larger than $W_x$, multiplied by the number of customers N.

Case of Limited Supply

Customers, however, may face shortages in the supply of products X and/or Y. Five different decisions are possible for each customer:

(1) If $W_x(\omega)<0$ and $W_y(\omega)<0$, customer $\omega$ buys nothing
(2) If $W_x(\omega)>W_y(\omega)>0$, customer $\omega$ buys product X if available; otherwise he tries to buy product Y
(3) If $W_y(\omega)>W_x(\omega)>0$, customer $\omega$ buys product Y if available; otherwise he tries to buy product X
(4) If $W_x(\omega)>0>W_y(\omega)$, customer $\omega$ buys product X if available, nothing otherwise
(5) If $W_y(\omega)>0>W_x(\omega)$, customer $\omega$ buys product Y if available, nothing otherwise Define potential expected demands, $U_x$ and $U_y$, for products X and Y, respectively, as the expected demand in the unlimited supply case. Hence, $U_x$ is the expected number of customers making either decision (2) or (4). In other words, these are the customers with product X as their first choice. Similarly, $U_y$ is the expected number of customers making either decision (3) or (5). In other words, these are the customers with product Y as their first choice.

$$U_x = N\,\text{Prob}\{\omega: \text{decision}(\omega)\text{ is }(2)\text{ or }(4)\} \qquad (2)$$

$$U_y = N\,\text{Prob}\{\omega: \text{decision}(\omega)\text{ is }(3)\text{ or }(5)\}$$

Define $T_x$ as the expected number of customers making decision (2), (3), or (4). These are the customers who would consider buying product X even if not in the first place. Similarly, $T_y$ is the expected number of customers making decision (2), (3), or (5). These are the customers who would consider buying product X even if not in the first place.

$$T_x = N\,\text{Prob}\{\omega: \text{decision}(\omega)\text{ is }(2),(3),\text{or}(4)\} \qquad (3)$$

$$T_y = N\,\text{Prob}\{\omega: \text{decision}(\omega)\text{ is }(2),(3),\text{or}(5)\}$$

Remark 1: Potential expected demands depend on the actual retail prices, $P_x$ and $P_y$, because the prices influence the subjective gains and therefore the probabilities of the particular decision.

In order to establish the actual expected demand functions, it is necessary to consider what happens when one of the products is not available anymore. Our model represents consumer demand as the flow of customers purchasing products over time and assumes that in such a flow the customers' preferences are independent of the arrival moment.

Three cases are distinguishable, covering the various possible situations.

Case 1: If potential expected demands $U_x$ and $U_y$ are smaller than order quantities x and y, then the actual expected demands are identical to the potential expected demands.

$$D_x = U_x$$

$$D_y = U_y$$

Case 2: Otherwise, suppose that the product X exhausts first. This means that $x<U_x$, but it also means that $x/U_x<y/U_y$. The portion of customers who already visited the store is given by $x/U_x$ at the moment when product X exhausts. The portion of customers who have not yet visited the store is $1-x/U_x$. The amount of product Y sold up to this moment is equal to $U_y x/U_x$. In this case, the expected demand for product X is equal to order quantity x. The expected demand for product Y is the minimum of the order quantity y and the sum of the demand up to the exhaustion moment, $U_y x/U_x$, and the expected demand after this moment, $(1-x/U_x)$ multiplied by $T_y$, the number of customers who would consider buying product Y even if not in the first place.

$$D_x = x$$

$$D_y = \min[y, U_y x/U_x + (1-x/U_x)T_y]$$

Case 3: Similarly, if the product Y exhausts first, $y<U_y$ and $y/U_y<x/U_x$:

$$D_x = \min[x, U_x y/U_y + (1-y/U_y)T_x]$$

$$D_y = y$$

Demand for all three cases may be written in a more compact way.

$$D_x = \min[x, U_x y/U_y + (1-y/U_y)^+ N\,\text{Prob}\{\omega: \text{decision}(\omega)\text{ is }(4)\}] \qquad (4)$$

$$D_y = \min[y, U_y x/U_x + (1-x/U_x)^+ N\,\text{Prob}\{\omega: \text{decision}(\omega)\text{ is }(5)\}]$$

where the + sign in the superscript means that we take the value of the expression if it is positive and zero otherwise.

Retailer's Profit Maximization

The retailer's expected profit maximization (equation (1)) yields optimal retail prices $P_x^*$ and $P_y^*$ and optimal order quantities $x^*$ and $y^*$.

Properties of the Model with Two Products

We cannot present a closed-form solution to the retailer's expected profit maximization problem because of its complexity. Thus, in general, the solution has to be found numerically. Nonetheless, the closed-form solution for a specific customer preference distribution is discussed in the example below.

In general, we are able to identify a number of properties of the retailer's profit function. We formulate them for product X but they hold analogously for product Y.

Property 1: The expected potential demand $U_x$ as a function of the retail prices, $P_x$ and $P_y$, is non-increasing in $P_x$ and non-decreasing in $P_y$. These are the customers whose first choice would be X, given the prices $P_x$ and $P_y$.

Property 2: The expected number of customers who would consider buying product X even if not in the first place is non-increasing in $P_x$ and independent of $P_y$.

Property 3: If the retailer is not obliged to order positive quantities, then his optimal expected profit is non-negative. This implies that the optimal solution might require zero order quantities in some situations. These situations may be caused by the wholesale price exceeding the preferences of all customers. They may also be caused by a much lower profit margin for one product than for the other product, so that the retailer's interest is to drive as many customers as possible to the more profitable product.

Property 4: There always exists an optimal solution with retail prices not below the wholesale prices.

Property 5: For any retail prices, $P_x$ and $P_y$, and any order quantity x, ordering more than $U_y x/U_x + (1-x/U_x)^+ N \operatorname{Prob}\{\omega: \operatorname{decision}(\omega) \text{ is } (5)\}$ yields a lower expected profit than ordering exactly this amount:

$$\Pi(x,y,P_x,P_y) \leq \Pi(x,D_y,P_x,P_y) \quad (5)$$

Property 6: For prices and order quantities maximizing the retailer's expected profit, we have $$D_y(x^*,y^*,P_x^*,P_y^*) = y^* \quad (6)$$

In other words, the expected demand for product Y is equal to the order quantity of product Y if the prices and order quantities are optimal.

Property 7: Ordering both products, X and Y, above expected potential demands yields lower expected profit than ordering exactly expected potential demands of both products. If $$P_x > w_x, \text{ and } P_y > w_y, \text{ and } x \geq U_x, \text{ and } y \geq U_y, \quad (7)$$

then $$\Pi(x,y,P_x,P_y) \leq \Pi(U_x,U_y,P_x,P_y)$$

Property 8: There are cases where the order quantity for one of the two products larger than the expected potential demand for this product yields a higher expected profit than ordering the expected potential demand. In this case, the order quantity for the other product is zero.

Assume that $$P_x > w_x, \text{ and } P_y > w_y, \text{ and } x < U_x.$$

If $$U_x(P_x - w_x) < N \operatorname{Prob}\{\omega: \operatorname{decision}(\omega) \text{ is } (2)\}(P_y - w_y), \quad (8)$$

then $$\Pi(x,y,P_x,P_y) \leq \Pi(0,T_y,P_x,P_y),$$

otherwise $$\Pi(x,y,P_x,P_y) \leq \Pi(U_x,U_y,P_x,P_y).$$

Property 9: For given retail prices, the optimal order quantity of a product is equal either to zero (and then the product is not offered at all) or to the expected number of customers for whom this product is the first choice.

Extension of the Model to More Than Two Products

When more than two products are available the search for the optimal solutions (largest retailer's profit) may be very complicated due to the highly nonlinear dependence of the profit from the proposed retail prices. In addition, the domain of the definition of the profit function is partitioned into regions (of the different quantities) where it has different forms. Moreover, it is important to consider the brand-switching phenomenon at the moment when the supply does not meet the demand. Fortunately, only a finite set of possible procurement quantities comes into consideration. Namely, for each group of proposed retail prices, and therefore for each distribution of subjective gains, it is enough to check the collection of subset of products the retailer wishes to order from the wholesaler. For each such subset, the optimal quantities for any product are determined by the number of customers whose first preference is this product (assuming it will be provided). Thus, the optimum to be calculated is not an optimum over all retail prices and all quantities but is instead an optimum over all retail prices and all the (finite) subsets of products to be procured from the wholesaler.

An Example with Closed-Form Solution

This example assumes that the distribution of preferences is perfectly negatively correlated, so that, for each customer ω, $$g_x(\omega)/C_x + g_y(\omega)/C_y = 1.$$

This means that the pair of preferences $(g_x, g_y)$ lies for each customer on the segment of the straight line between the points $(C_x,0)$ and $(0,C_y)$. Moreover, it is assumed that on this segment the distribution is uniform.

This allows one to calculate the probabilities of the customers' decisions (1) through (5), which will uniquely depend on the retail prices:

| Decision | Buy | Probability |
| --- | --- | --- |
| (1) | Nothing | $\operatorname{Max}\{0, P_x/C_x + P_y/C_y - 1\}$ |
| (2) | X, otherwise Y | $\operatorname{Max}\{C_x/(C_x + C_y)(1 - P_x/C_x - P_y/C_y), 0\}$ |
| (3) | Y, otherwise X | $\operatorname{Max}\{C_y/(C_x + C_y)(1 - P_x/C_x - P_y/C_y), 0\}$ |
| (4) | X, otherwise nothing | $\operatorname{Min}\{P_y/C_y, 1 - P_x/C_x\}$ |
| (5) | Y, otherwise nothing | $\operatorname{Min}\{P_x/C_x, 1 - P_y/C_y\}$ |

The first choices in the Max and Min expressions correspond to the case that $P_x/C_x + P_y/C_y < 1$, while the second choices correspond to the case that $P_x/C_x + P_y/C_y > 1$.

Plugging these probabilities into the retailer's profit function and using the properties discussed above, one finds the optimal profit $$\Pi(x^*,y^*,P_x^*,P_y^*) = N/4[(C_x - w_x)^2/C_x + [(C_y - w_y)^2/C_y] \quad (9)$$

at $$x^* = N(1 - P_x/C_x)$$

$$y^* = N(1 - P_y/C_y)$$

$$P_x^* = (C_x + w_x)/2$$

$$P_y^* = (C_y + w_y)/2$$

An Application to More General Distributions

As stated above, it is in general not possible to find a closed-form solution and recourse must be made to numerical methods.

Suppose that the distribution of customer preferences is given in form of a table. In the case of two brands, it is a two-dimensional table. The rows and columns of this table represent the intervals of the preferences of the two products. The entries of the table represent the number of customers with preferences in those intervals.

Assume a pair of wholesale prices. For each pair of retail prices above or equal to the respective wholesale prices, one can calculate the number of customers making a decision (1) through (5), making interpolations if necessary (assuming uniform distribution in each cell). Using the formulas for demand and the properties discussed above, one may calculate the optimal quantities for each pair of retail prices and the corresponding retailer's profit, thus making it possible to choose the optimal pair of retail prices.

The present invention thus provides a system, a method, and a machine-readable medium for providing instructions for a computer, which given a distribution of upper limits of prices a consumer is willing to pay for each of a plurality of products given their list prices, and given wholesale price data for a plurality of products, determines profit-maximizing retail prices and amounts of products to be ordered provides the resulting list of quantities and prices as one or more of a printout, a machine-readable data output to storage, and directly as inputs to data processing. The computer may be connected to a network, and the network may be the Internet. Said wholesale price data and the distribution of customer preferences may be obtained from a database connected to such a network.

The method, system, and machine-readable medium thus provided according to the present invention determine prices and order quantities that maximize a retailer's expected profit for a specific product category by: using a computer to determine expected demand for products based on a distribution of upper limits of prices each customer is willing to pay for each of a plurality of products and based on given proposed retail prices; using a computer to determine an amount of products to be ordered by calculating profit based on one or more of available wholesale price data, proposed retail prices, and said determined demand at said proposed retail prices; using a computer to determine retail prices based on available wholesale prices, a distribution of upper limits of prices each customer is willing to pay for given products, and said determined demand for products and said determined order quantities, both depending on retail prices; and providing a list of quantities and prices as one or more of a printout, a machine-readable data output to storage, and directly as input to data processing. The computer may or may not be connected to a network, and the network may or may not be the Internet. The wholesale price data may or may not be obtained from a database connected to such a network. The retail prices determined by the computer may or may not be profit-maximizing retail prices.

The present invention provides a computer-implemented method for determining prices and order quantities that maximize a retailer's expected profit for a specific product category comprising the steps of: using a customer survey to determine prices customers are willing to pay for a product; and based on said survey, using a computer to define a model of customers' in-store brand choice as a function of a distribution of prices customers are willing to pay. The prices determined by this method may or may not be maximum prices customers are willing to pay.

DETAILED DESCRIPTION OF THE PREFERRED EMBODIMENTS OF THE INVENTION

The present invention produces the prices and order quantities that maximize a retailer's total profit for a specific product category, taking the distribution of customer preferences into account, under the following given conditions:

There is a joint multi-dimensional distribution of the highest prices customers are willing to pay, estimated based on survey or historical data (described, for example, as a multi-index table or a database), the number of indices in such a table would correspond to the number of brands while the dimension of each index would correspond to the number of considered price-intervals for the respective brand. The entries of such a table would be the percentage of customers for whom the respective prices are the maximally acceptable prices for each of the brands.

There is a known monetary cost of each brand to the retailer, including the unit wholesale price, shipping, storage, shelf and others.

There is the list price of each of the brands, representing caps to the multi-index preference table.

There is a given estimated total number of customers visiting the store.

Taking those conditions as given, the procedure of the present invention is as follows.

A. For any proposed list of retail prices, using the distribution of highest prices customers are willing to pay, determine the distribution of subjective gains. Each customer orders the products he is willing to buy by the highest, nonnegative subjective gain, assuming that it is available.

B. Using the distribution of customers with the same ordering for the proposed retail prices and for each subset of available products, determine the demands for each product. This will constitute the amounts of each product to be ordered.

C. Using the calculated amounts to be ordered, given wholesale prices and proposed retail prices, calculate the profit of the retailer.

D. Maximize the profit by choosing the list of retail prices that yields the highest profit. The result of this procedure is a list of order quantities and prices, which may be provided as a graphic or nongraphic printout, and/or as machine-readable data output to storage or directly as input to data processing, for use in ordering and pricing application.

Figure 1:
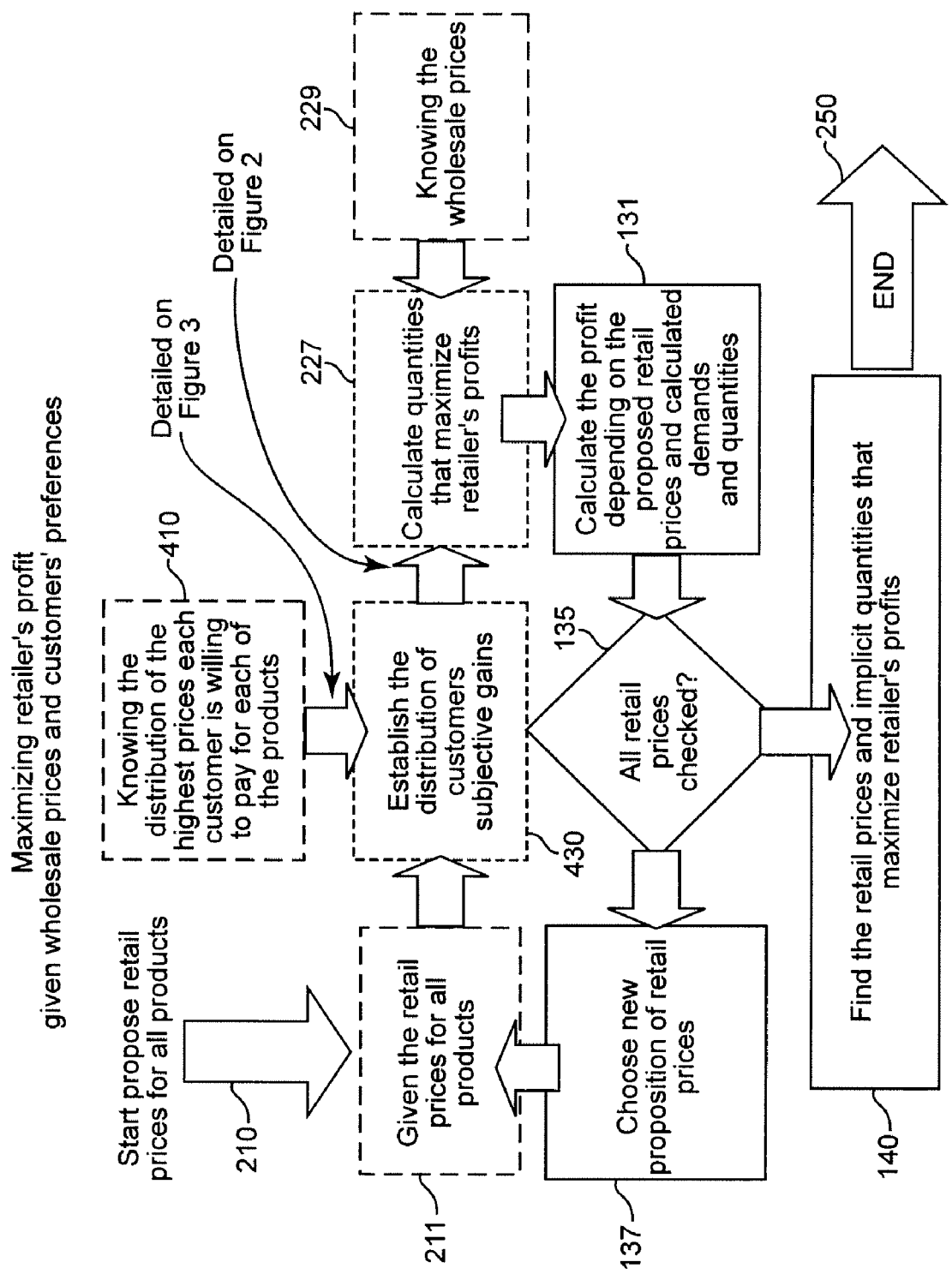
FIG. 1 shows a schematic for maximization of retailer's expected profit (simply denoted as profit hereafter) given wholesale prices and customers' preferences.

Referring now to the drawings, and more particularly to FIG. 1, which shows the complete process, there is shown the maximization of retailer's profit given wholesale prices and customers' preferences. Starting with proposed retailer prices for all products, as shown in step 210, the proposed retail prices are used as input, as shown in step 211, to establish the distribution of customers' subjective gains, as shown in step 430. Also used as input for step 430 is the knowledge of the distribution of the highest prices each customer is willing to pay for each of the products, as shown in step 410. Both the distribution of customers' subjective gains, as shown in step 430, and the knowledge of wholesale prices, as shown in step 229, are used to calculate quantities that maximize a retailer's profit, as shown in step 227. Profit is then calculated based on proposed retail prices and calculated demands and quantities, as shown in step 131. In step 135, a determination is made whether all retail prices have been checked. If no, then a new proposition of retail prices is chosen as shown in step 137, with the new proposition being used to update the proposed retail prices for all products in step 211. Steps are reiterated, beginning with step 430, using the updated step 211 as input. When step 135 determines that all retail prices have been checked, the retail prices and implicit quantities that maximize the retailer's profit are found, as shown in step 140, and the process is ended, as shown in step 250.

Figure 2:
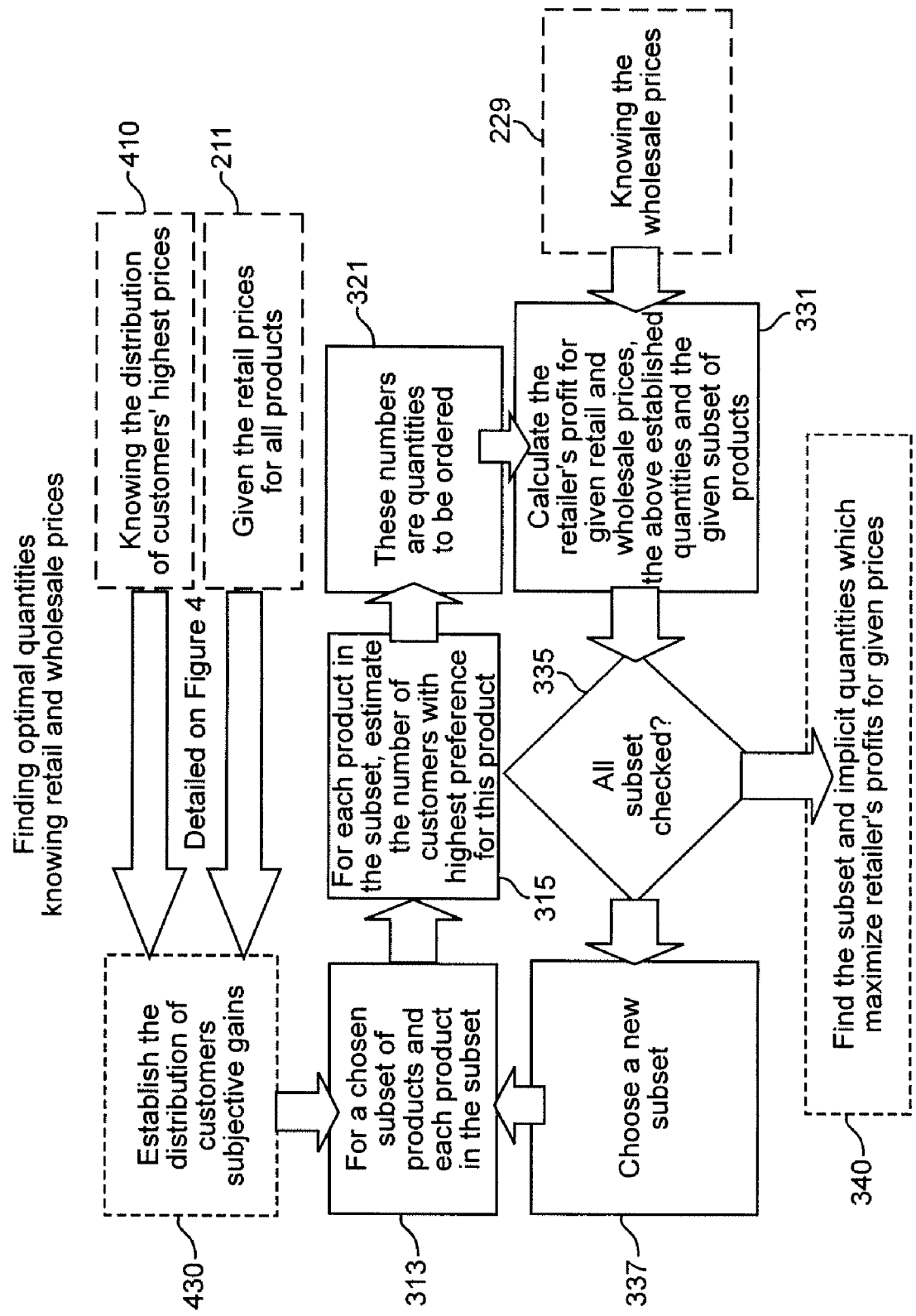
FIG. 2 shows a schematic for determination of optimal quantities when retail and wholesale prices are known.

FIG. 2 details step 227, showing the determination of optimal quantities to order when retail and wholesale prices are known. Beginning with knowledge of the distribution of customers' highest prices, as shown in step 410, and proposed retail prices for all products, as shown in step 211, the distribution of customers' subjective gains is established, as shown in step 430. A Subset of products is then chosen, as shown in step 313, and, for each product in this subset, the number of customers with the highest preference for that product is estimated, as shown in step 315. Taking the number of customers with the highest preference for a product as the quantity to be ordered, as shown in step 321, the retailer's profit is calculated, as shown in step 331, based on knowledge of wholesale prices, as shown in step 229, as well as on proposed retail prices, the above established quantities, and the given subset of products. In step 335, a determination is made whether all subsets have been checked. If no, then a new subset is chosen as shown in step 337, with the new subset being used to update the choice of subset of products in step 313. Steps are reiterated, beginning with step 315, for the updated choice of step 313. When step 335 determines that all subsets have been checked, the subset and implicit quantities which maximize the retailer's profit for given prices are found, as shown in step 227 in FIG. 1.

Figure 3:
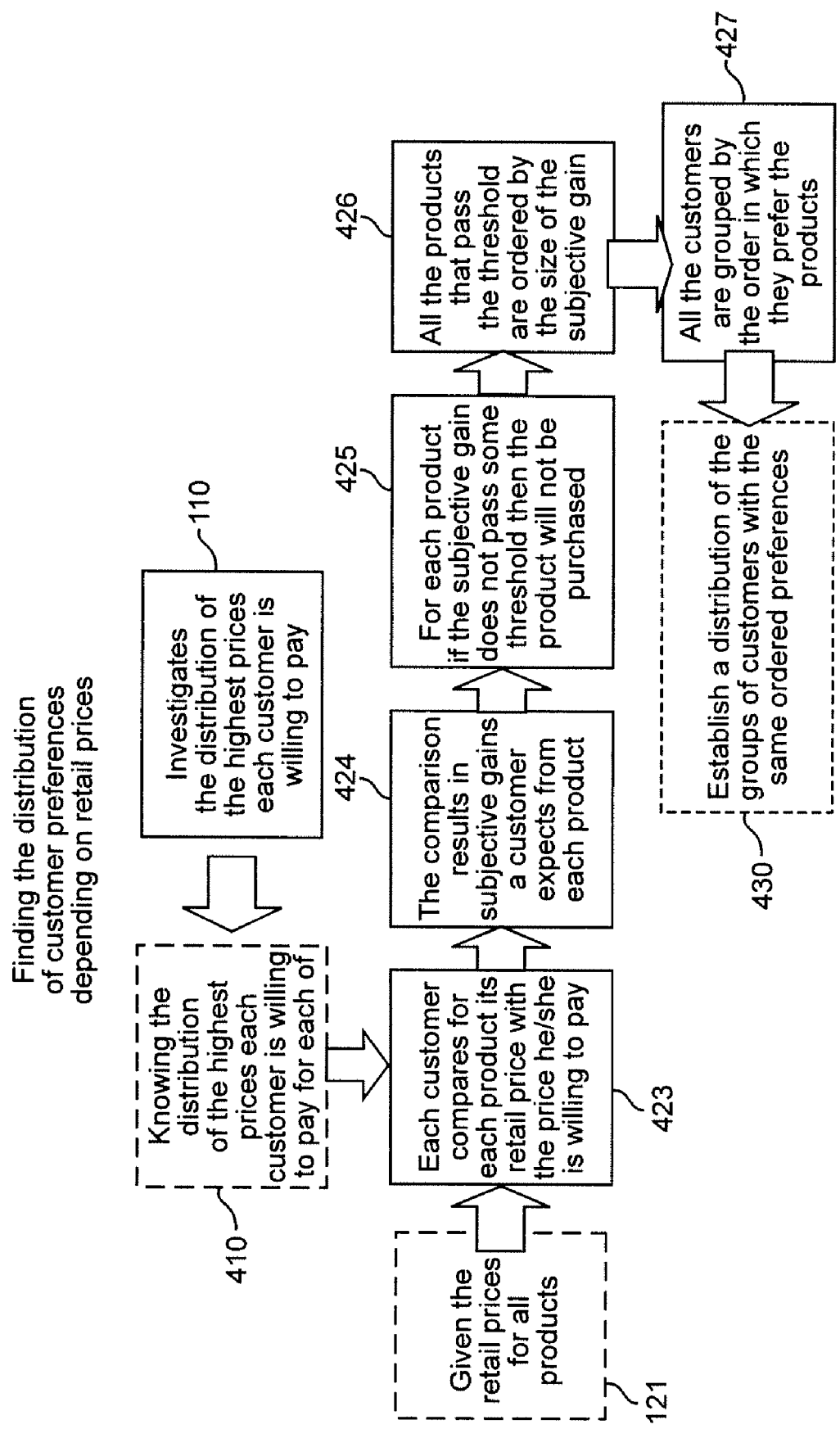
FIG. 3 shows a schematic for determination of the distribution of customer preferences depending of retail prices.

Referring to FIG. 3, which details step 430, there is shown the determination of the distribution of customer preferences depending on proposed retail prices. This figure shows in greater detail how knowledge of customers' highest prices and the retail prices for all, as shown in steps 410 and 211 of FIG. 2, is used as input to establish the distribution of customers' subjective gains, as shown in step 430 of FIG. 2. An investigation of the distribution of the highest prices each customer is willing to pay is undertaken, as shown in step 110, resulting in knowledge of the distribution of the highest prices each customer is willing to pay, as shown in step 410. That knowledge is used as input for step 423, in which each customer compares the retail prices of each product with the price the customer is willing to pay. Also used as input for step 423 is the retail price for each product, as shown in step 121. Based on the customer comparison of step 423, the comparison produces a determination of subjective gains a customer expects from a product, as shown in step 424. For each product, if the subjective gain does not pass some threshold, then the product will not be purchased, as shown in step 425; by contrast, all the products that do pass the threshold are ordered according to the size of the subjective gain, as shown in step 426. All the customers are then grouped by the order in which they prefer the products, as shown in step 430. The result, as shown in step 430, is to establish a distribution of the groups of customers with the same ordered preferences.

Figure 4:
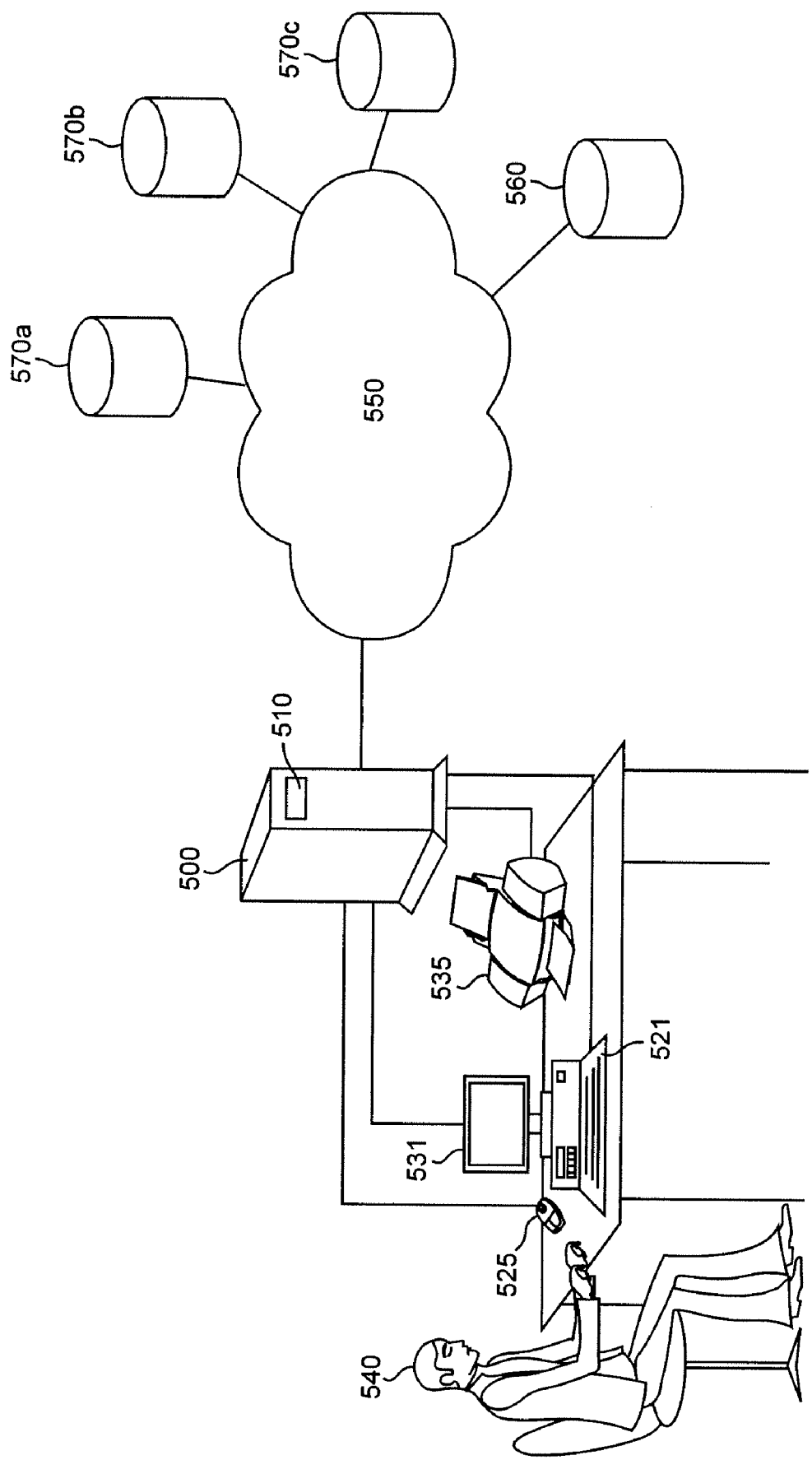
FIG. 4 shows an example of a system according the claimed invention, in which wholesale price data is obtained over a network.

FIG. 4 shows an example of a system according the claimed invention, in which wholesale price data is obtained over a network. A computer 500 has a machine-readable medium 510 for providing instructions. An operator 540 is able to provide input via a keyboard 521 or mouse 525, and the computer is able to provide output via a monitor 531 or a printer 535. The computer is connected to a network 550 to which is connected a database 560 from which the computer may obtain wholesale price data. Other data may be obtained from other databases 570a, 570b, and 570c connected to the network 550.

The manager 540 of a retail store who wants to determine order quantities and retail prices of a number of products in a specific category may thus use the computer 500, which runs software based on the present invention. The program pulls information on customer preferences from a remote data base 570a, and the manager enters information on wholesale prices using the keyboard 521 or copies it from a portable memory device 510. This is one example; data input may be provided in many different ways. The manager 540 then employs the computer-implemented method of the present invention to determine profit-maximizes prices and order quantities. The resulting list of optimal retail prices and optimal quantities to order is displayed on the screen 531, printed out on printer 535 and stored in a database 560. The data stored in database 560 can be streamlined into other software.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for determining prices and order quantities that maximize a retailer's expected profit for a specific product category of horizontally differentiated products, comprising the steps of:
   using a computer to determine expected demand for products based on a distribution of upper limits of prices each customer is willing to pay for each of a plurality of products and based on given proposed retail prices;
   using a computer to determine an amount of products to be ordered by calculating profit based on one or more of
      available wholesale price data,
      proposed retail prices, and
      said determined demand at said proposed retail prices;
   using a computer to determine retail prices based on
      available wholesale prices,
      a distribution of upper limits of prices each customer is willing to pay for given products,
      wherein said retail prices determined by said computer are profit-maximizing retail prices, and
      said determined demand for products and said determined order quantities, both depending on said retail prices; and
   providing a list of quantities and prices as one or more of
      a printout,
      a machine-readable data output to storage, and
      directly as input to data processing.

2. The method of claim 1, wherein the computer is connected to a network.

3. The method of claim 2, wherein the network is the Internet.

4. The method of claim 2, wherein said wholesale price data is obtained from a database connected to said network.

* * * * *